US012687877B2

(12) United States Patent
Lien et al.

(10) Patent No.: US 12,687,877 B2
(45) Date of Patent: Jul. 21, 2026

(54) VOLTAGE REFERENCE CIRCUIT USING FIELD-EFFECT TRANSISTORS

(71) Applicant: TAIWAN SEMICONDUCTOR MANUFACTURING COMPANY, LTD., Hsinchu (TW)

(72) Inventors: Bei-Shing Lien, Hsinchu (TW); Szu-Lin Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 2 days.

(21) Appl. No.: 18/760,661

(22) Filed: Jul. 1, 2024

(65) Prior Publication Data

US 2025/0284305 A1 Sep. 11, 2025

Related U.S. Application Data

(60) Provisional application No. 63/562,451, filed on Mar. 7, 2024.

(51) Int. Cl.
*G05F 3/26* (2006.01)

(52) U.S. Cl.
CPC .................................... *G05F 3/262* (2013.01)

(58) Field of Classification Search
None
See application file for complete search history.

(56) References Cited

U.S. PATENT DOCUMENTS

| | | | | | |
|---|---|---|---|---|---|
| 5,432,432 | A * | 7/1995 | Kimura | G05F 3/245 | 323/313 |
| 5,838,191 | A * | 11/1998 | Opris | G05F 3/262 | 327/539 |
| 5,982,206 | A * | 11/1999 | Tachio | G05F 3/262 | 327/427 |
| 7,652,520 | B2 * | 1/2010 | Gatta | H10D 84/83 | 327/581 |
| 8,013,588 | B2 * | 9/2011 | Imura | G05F 3/242 | 323/316 |
| 8,680,840 | B2 * | 3/2014 | Iacob | G05F 3/242 | 323/907 |
| 9,000,749 | B2 * | 4/2015 | Kobayashi | G05F 3/242 | 323/315 |

(Continued)

FOREIGN PATENT DOCUMENTS

| | | |
|---|---|---|
| TW | 201939048 | 10/2019 |
| TW | 202328647 | 7/2023 |
| TW | 202346817 | 12/2023 |

*Primary Examiner* — Thomas J. Hiltunen
(74) *Attorney, Agent, or Firm* — Hauptman Ham, LLP

(57) ABSTRACT

An integrated circuit is provided, which includes a first temperature-sensitive device and a second temperature-sensitive device. The first temperature-sensitive device is configured to generate a reference voltage at an output terminal of the integrated circuit. The second temperature-sensitive device is coupled to the output terminal of the integrated circuit through a resistor, and configured to operate in conjunction with the first temperature-sensitive device to generate a first bias current flowing from the output terminal of the integrated circuit to a ground node through the resistor and the first temperature-sensitive device. The first bias current monotonically increases as an absolute temperature of the integrated circuit increases.

20 Claims, 11 Drawing Sheets

(56) References Cited

U.S. PATENT DOCUMENTS

| | | | | |
|---|---|---|---|---|
| 11,353,903 | B1 * | 6/2022 | Coban | G05F 1/445 |
| 11,756,950 | B2 * | 9/2023 | Chang | H10D 84/83 257/499 |
| 2009/0146988 | A1 * | 6/2009 | Johnson | G09G 3/325 345/76 |
| 2011/0001546 | A1 * | 1/2011 | Guo | G01K 3/005 327/512 |
| 2016/0265983 | A1 | 9/2016 | Hsu et al. | |
| 2018/0164163 | A1 | 6/2018 | Pandiri et al. | |

* cited by examiner

VOLTAGE REFERENCE CIRCUIT USING FIELD-EFFECT TRANSISTORS

PRIORITY CLAIM

This application claims the benefit of U.S. Provisional Application No. 63/562,451, filed Mar. 7, 2024, the entire disclosure of which is incorporated by reference herein.

BACKGROUND

The current trend in miniaturizing integrated circuits (ICs) has led to the development of smaller, more efficient devices with increased functionality and higher operating speeds. This miniaturization process has also brought about more stringent design and manufacturing requirements, as well as reliability challenges. Electronic design automation (EDA) tools are utilized to create, optimize, and validate standard cell layout designs for integrated circuits, ensuring that they meet both design and manufacturing specifications.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features can be arbitrarily increased or reduced for clarity of discussion.

DETAILED DESCRIPTION

Figure 1A:
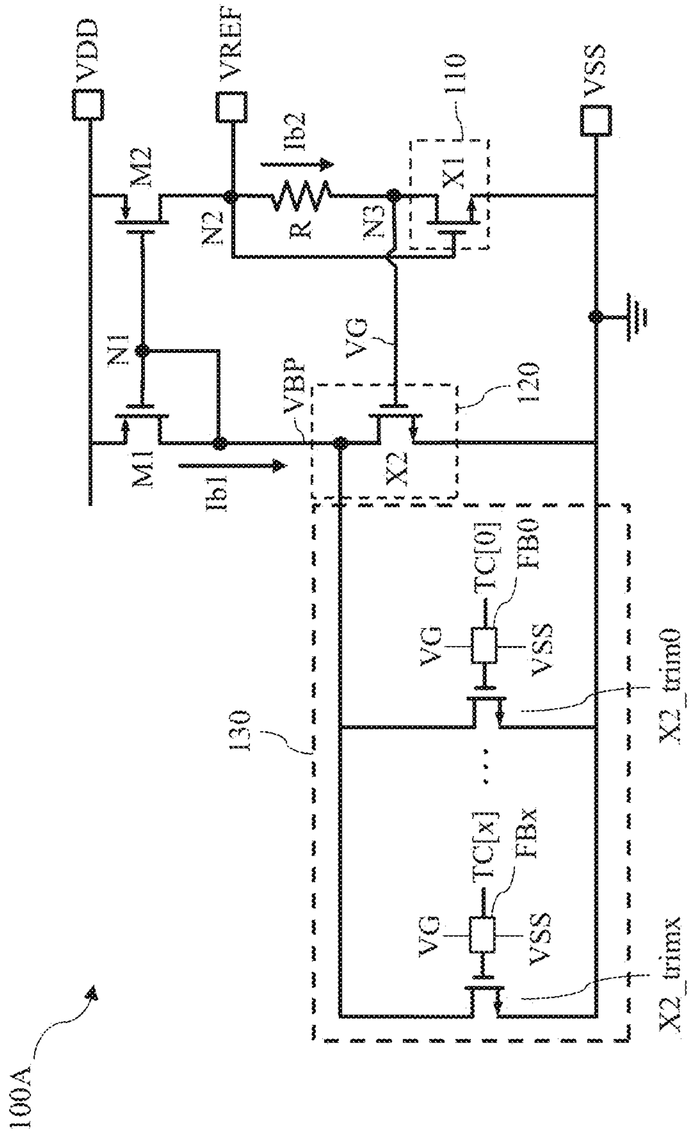
FIG. 1A is a schematic diagram of a voltage reference circuit in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “over,” “upper,” “on” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, it will be understood that when an element is referred to as being “connected to” or “coupled to” another element, it can be directly connected to or coupled to the other element, or intervening elements can be present.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device can be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

In some embodiments, a voltage reference circuit is implemented to generate a reference voltage using stacked gate devices. A stacked gate device includes a plurality of field-effect transistors having a common gate terminal, and having channels connected in series. A first temperature-sensitive device is implemented based on a first stacked gate device to generate a first gate-to-source voltage which monotonically decreases with an absolute temperature of the voltage reference circuit. A second temperature-sensitive device is implemented based on a second stacked gate device to generate a second gate-to-source voltage which monotonically decreases with the absolute temperature of the voltage reference circuit. A bias current, which monotonically increases with the absolute temperature, is generated according to the first gate-to-source voltage and the second gate-to-source voltage. The temperature dependency of the reference voltage generated by the voltage reference circuit can be compensated using the first voltage and the bias current.

Figure 1C:
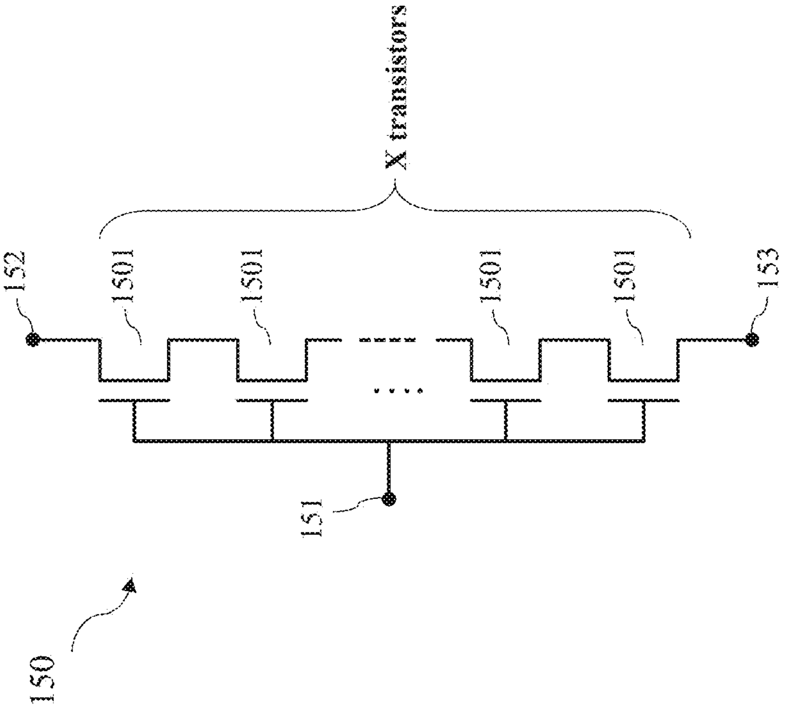
FIG. 1C is an equivalent circuit diagram of the stacked gate device in FIG. 1B.
Figure 1B:
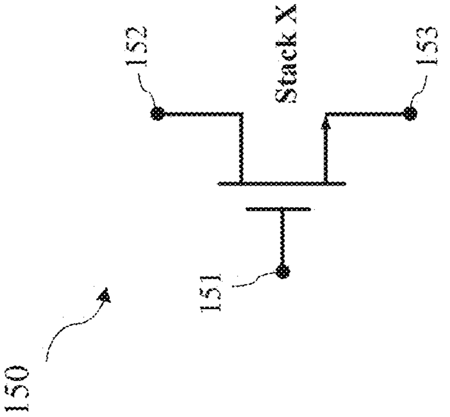
FIG. 1B is a diagram of a stacked gate device in accordance with some embodiments of the present disclosure.

FIG. 1A is a schematic diagram of a voltage reference circuit in accordance with some embodiments of the present disclosure. FIG. 1B is a diagram of a stacked gate device in accordance with some embodiments of the present disclosure. FIG. 1C is an equivalent circuit diagram of the stacked gate device in FIG. 1B.

In some embodiments, the voltage reference circuit 100A is a bandgap voltage reference circuit which provides a reference voltage VREF. The voltage reference circuit 100A may include transistors M1 to M2, temperature-sensitive devices 110 and 120, and a trimming circuit 130, as depicted in FIG. 1A. The transistors M1 to M2 may be field-effect transistors (FETs, referred as "transistors" hereafter). Each of the transistors M1 to M2 has a gate terminal and a channel between a source terminal and a drain terminal. The current passing through the channel depends on the voltage difference applied to the gate terminal of each transistor M1 to M2.

The voltage reference circuit 100A includes stacked gate devices X1, X2, and X2_trim0 to X2_trimx. Each of the stacked gate devices X1 and X2 includes a plurality of field-effect transistors stacked together. The references X1 and X2 are also used to represent the number of FETs connected in series in each respective stacked gate devices X1 and X2. Additionally, each of the stacked gate devices X2_trim0 to X2_trimx have the same number of stacked transistors as the stacked gate device X2 within the temperature-sensitive device 120, but the numbers of finger structures of the stacked gate devices X2_trim0 to X2_trimx may differ from that of the stacked gate device X2. The details of a stacked gate device are described as follows.

In some embodiments, a stacked gate device 150, also known as "stack X" in FIG. 1B, may be regarded as a three-terminal transistor device with a gate terminal 151, a source/drain (S/D) terminal 152, and a (S/D) terminal 153. The equivalent circuit diagram of the stacked gate device 150 includes a plurality of transistors 1501 arranged in a cascode structure or a stack structure, as shown in FIG. 1C. The total number of stacked transistors 1501 is denoted as an integer X. For example, the gate terminals of the transistors 1501 are connected together to form the gate terminal 151 of the stacked gate device 150. Additionally, the transistors 1501 may be N-type FETs, and the N-type channels of the transistors 1501 (e.g., X transistors 1501) are connected in series between the (S/D) terminal 152 and the (S/D) terminal 153 of the stacked gate device 150. For example, the (S/D) terminal of the first transistor 1501 serves as the (S/D) terminal 152 of the stacked gate device 150, and a (S/D) terminal of the first transistor 1501 is connected to a (S/D) terminal of the second transistor 1501, a (S/D) terminal of the second transistor 1501 is connected to a (S/D) terminal of the third transistor 1501, . . . , and so on. In other words, for each integer n between 1 to X−1, the (S/D) terminal of the n-th transistor 1501 is connected to the (S/D) terminal of the (n+1)-th transistor 1501. Accordingly, the (S/D) terminal of the last transistor 1501 (i.e., X-th transistor 1501) serves as the (S/D) terminal 153 of the stacked gate device 150.

Figure 1E:
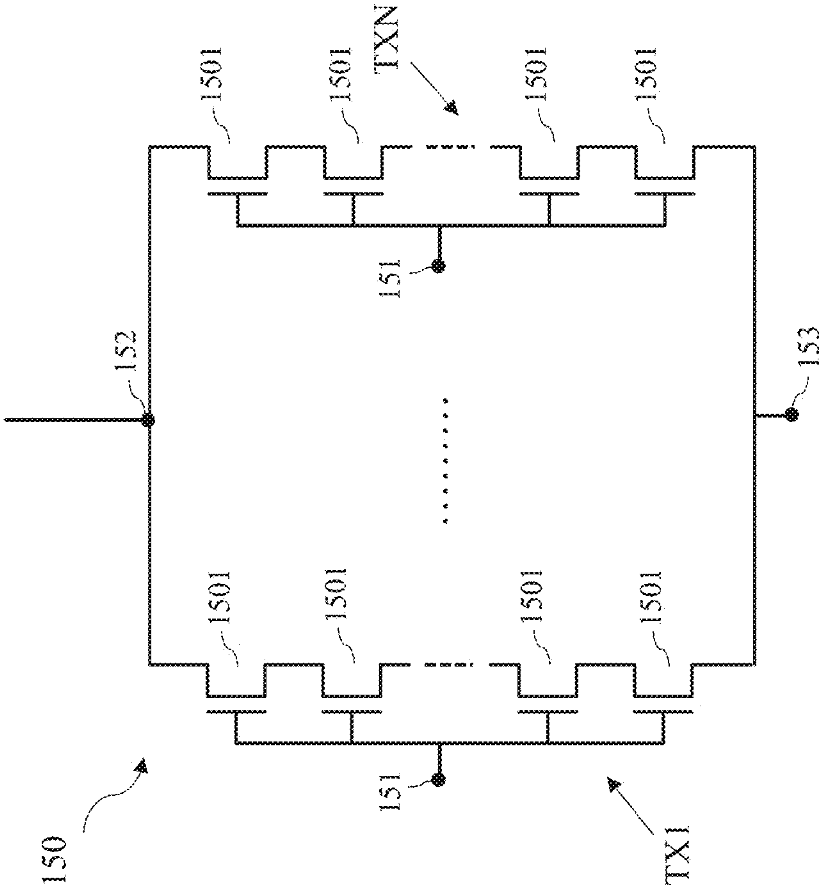
FIG. 1E is an equivalent circuit diagram of the stacked gate device in FIG. 1D.
Figure 1D:
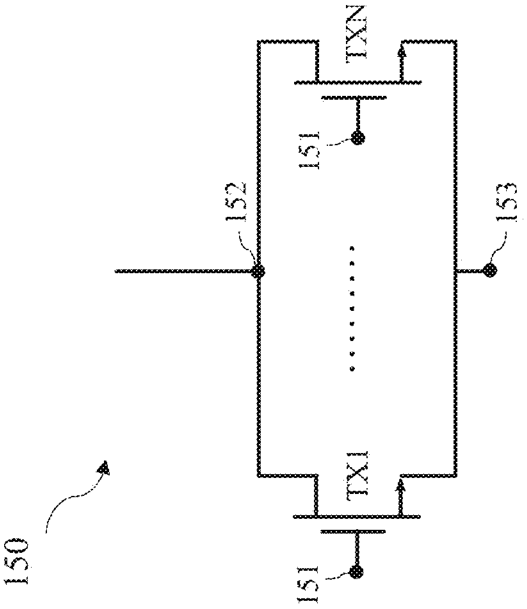
FIG. 1D is a diagram of a stacked gate device with multiple finger structures in accordance with some embodiments of the present disclosure.

FIG. 1D is a diagram of a stacked gate device with multiple finger structures in accordance with some embodiments of the present disclosure. FIG. 1E is an equivalent circuit diagram of the stacked gate device in FIG. 1D.

In some embodiments, the stacked gate device 150 shown in FIG. 1B includes one or more stacked gate devices TX1 to TXN arranged in parallel, as shown in FIG. 1D, where N is a positive integer. Each of the stacked gate devices TX1 to TXN can be regarded as a finger structure or a "finger", which includes X transistors 1501 arranged in a cascode structure or a stack structure, as shown in FIG. 1E. For example, the channel of the transistors 1501 within each stacked gate device TX1 to TXN are connected in series to form the respective channel of each stacked gate device TX to TXN. Additionally, the channel of each stacked gate device TX1 to TXN is coupled between the (S/D) terminal 152 and (S/D) terminal 153 of the stacked gate device 150, while the gate terminals of stacked gate devices TX1 to TXN are connected to the gate terminal 151 of the stacked gate device 150. When the stacked gate device 150 includes one finger structure, the equivalent circuit diagram of the stacked gate device 150 can be referred to FIG. 1C.

It should be noted that the transistors 1501 within the stacked gate devices TX1 to TXN may be fabricated within the same process, and thus have substantially the same electrical characteristics, such as channel width, channel length, threshold voltage, and transconductance. The design of a stacked gate device X with one or more finger structures shown in FIGS. 1D and 1E can applied to the stacked gate devices X1, X2, and X2_trim0 to X2_trimx in FIG. 1A, with the transistors therein having substantially the same electrical characteristics.

In some embodiments, the gate-to-source voltage Vgs of the stacked gate device 150 shown in FIG. 1B can be expressed by equation (1) as follows.

$$Vgs = Vth + \sqrt{\frac{2 \cdot I \cdot L1}{\mu \cdot Cox \cdot W1}} \tag{1}$$

where Vth denotes the threshold voltage of the stacked gate device 150; I denotes the bias current flowing through the stacked gate device 150; L1 and W1 denotes the channel length and channel width of the stacked gate device 150, respectively; Cox denotes the gate oxide capacitance of the stacked gate device 150 per unit area; μ denotes the mobility of electrons. It should be noted that as the temperature increases, the electrons become more energetic and the energy barrier between the (S/D) terminal 153 and the channel of the stacked gate device 150 is lower, allowing more carriers to be present in the channel, which in turn reduces the threshold voltage. In other words, when the bias current I is fixed, the threshold voltage Vth decreases as the temperature increases, causing the gate-to-source voltage Vgs of the stacked gate device 150 to monotonically decrease with the absolute temperature (e.g., complementary to the absolute temperature, CTAT).

Figure 2B:
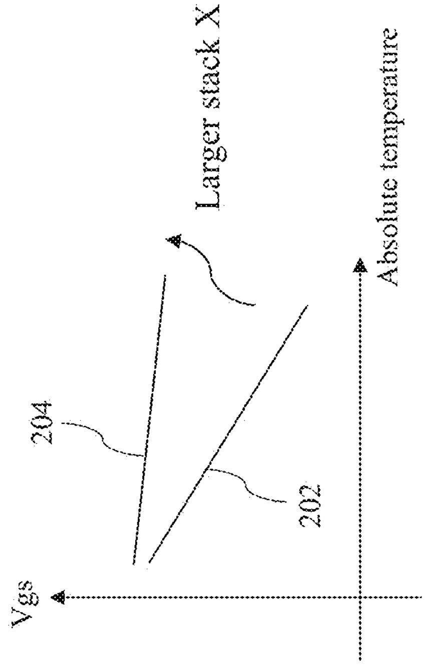
FIG. 2B is a diagram illustrating variations of a voltage-temperature curve of the stacked gate device in FIG. 2A.
Figure 2A:
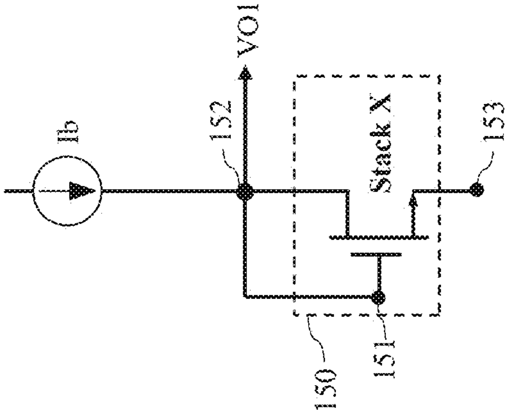
FIG. 2A is a schematic diagram of a stacked gate device in a diode-connected configuration in accordance with some embodiments of the present disclosure.

FIG. 2A is a schematic diagram of a stacked gate device in a diode-connected configuration in accordance with some embodiments of the present disclosure. FIG. 2B is a diagram illustrating variations of a voltage-temperature curve of the stacked gate device in FIG. 2A.

In some embodiments, the stacked gate device 150 is in a diode-connected configuration, indicating that the gate terminal 151 of a stacked gate device 150 is connected to the (S/D) terminal 152 of the stacked gate device 150, and a bias current Ib is provided to the stacked gate device 150, as shown in FIG. 2A. In such case, the voltage difference (e.g., gate-to-source voltage) Vgs between the gate terminal 151 and (S/D) terminal 153 of the stacked gate device 150 decreases as the absolute temperature of the stacked gate device X increases, as shown by curve 202 in FIG. 2B. Additionally, the downward slope of the voltage-temperature curve depends on the number of stacked transistors within the stacked gate device X. For example, as the number of stacked transistors increases (e.g., a larger stack X), the slope of the V-T curve decreases, as shown by curve 204 in FIG. 2B, indicating that the voltage difference Vgs between the gate terminal 151 and the (S/D) terminal 153 of the stacked gate device X becomes less sensitive to changes in absolute temperature. As a result, the output voltage VO1 generated by the stacked gate device 150 monotonically decreases in accordance with the absolute temperature (e.g., complementary to the absolute temperature, CTAT). Accordingly, the stacked gate device 150 in the configuration shown in FIG. 2A can be regarded as a CTAT device.

In some embodiments, the stacked gate device 150 in the configuration shown in FIG. 1B has a similar downward V-T curve as shown by curve 202 in FIG. 2B. As the number of stacked transistors increases (e.g., a larger stack X), the downward slope of the V-T curve decreases, as shown by curve 204 in FIG. 2B, indicating that the voltage difference Vgs between the gate terminal 151 and the (S/D) terminal 153 of the stacked gate device X becomes less sensitive to changes in absolute temperature. That is, the downward slope of the V-T (Vgs vs. absolute temperature) curve of the stacked gate device 150 can become less steep as the number of stacked transistors within the stacked gate device 150 increases. This mechanism for the V-T curve can be applied to the stacked gate devices X1 and X2 shown in FIG. 1A.

Attention now is directed back to FIG. 1A. In some embodiments, the temperature-sensitive devices 110 and 120 include stacked gate devices X1 and X2, respectively. The number X1 of the stacked transistors within the stacked gate device X1 is greater than the number X2 of the stacked transistors within the stacked gate device X2. Based on the embodiments of FIGS. 2A-2B described above, it is seen that both the stacked gate devices X1 and X2 are CTAT devices, and the gate-to-source Vgs1 of the stacked gate device X1 and the gate-to-source Vgs2 of the stacked gate device X2 decrease as the absolute temperature of the voltage reference circuit 100A increases. It should be noted that since the number X1 is greater than the number X2, the stacked gate device X1 is less sensitive to changes in absolute temperature compared to the stacked gate device X2. Thus, the decrement of the gate-to-source voltage Vgs1 of the stacked gate device X1 is less than that of the gate-to-source voltage Vgs2 of the stacked gate device X2, indicating that the voltage difference Vgs1−Vgs2 increases as the absolute temperature increases. Additionally, while the bias current Ib2 can be calculated as (Vgs1−Vgs2)/R, it means that the bias current Ib2 flowing through the stacked gate device X1 increases as the absolute temperature increases. Therefore, the bias current Ib2 is a PTAT current which monotonically increases with the absolute temperature of the voltage reference circuit 100A.

In some embodiments, the reference voltage VREF is the same as the gate-to-source voltage Vgs1 of the stacked gate device X1, as depicted in FIG. 1A. According to equation (1), the threshold voltage Vth of the stacked gate device X1 decreases as the absolute temperature increases, while the bias current Ib2 increases as the absolute temperature increases, indicating that the temperature-sensitive device 110 acts as both a PTAT voltage source and a CTAT voltage source. This means that CTAT scheme of the threshold voltage Vth of the stacked gate device X1 can be compensated with PTAT scheme of the bias current Ib2 flowing through the stacked gate device X1, resulting in a self-compensated temperature coefficient of the reference voltage VREF. Additionally, the reference voltage VREF generated by the voltage reference circuit 100A could achieve a temperature coefficient substantially equal to 0 with an appropriate design of the number of stacked transistors within the stacked gate devices X1 and X2, and the number of finger structures within the stacked gate device X2. The details for adjusting the number of finger structures within the stacked gate device X2 using the trimming circuit 130 are described as follows.

In some embodiments, the reference voltage VREF generated at node N2 can be expressed in another way, such as VREF=Vgs2+Ib2*R, where Vgs2 denotes the gate-to-source voltage Vgs2 of the stacked gate device X2, and Ib2*R denotes the voltage drop across the resistor R. While the gate-to-source voltage Vgs2 is CTAT and the bias current Ib2 is PTAT, the CTAT scheme can also be compensated with the PTAT scheme in another way to generate the reference voltage VREF, resulting in a self-compensated temperature coefficient of the reference voltage VREF.

In some embodiments, the gate terminals of transistor M1 and M2 are electrically connected to node N1, and the source terminals of transistors M1 and M2 are electrically connected to the power supply voltage VDD. Since transistors M1 and M2 have the same gate-to-source voltage Vgs, transistors M1 and M2 may be configured to function as a first current mirror, and the bias current Ib2 passing through the channel of transistor M2 is proportional to the bias current Ib1 passing through the channel of transistor M1. When transistors M1 and M2 are designed with substantially the same electrical characteristics, such as channel width, channel length, threshold voltage, and transconductance, the bias current Ib2 flowing through transistor M2 is substantially equal to the bias current Ib1 flowing through transistor M1. Thus, transistor M1 may function as a current source as well as transistor M2. As described above, the bias current Ib2 is a PTAT current, indicating that the bias current Ib1 is also a PTAT current.

In some embodiments, the trimming circuit 130 may be configured to adjust (e.g., fine-tune) the voltage-temperature falling rate of the temperature-sensitive device 120 using a dynamic element matching ("DEM") technique. The trimming circuit 130 may include a plurality of trimming stacked gate devices X2_trim0 to X2_trimx. The gate terminal of each trimming stacked gate device X2_trim0 to X2_trimx is coupled to a respective bit of a trimming code signal TC[0: x] through a corresponding buffer circuit FB0 to FBx. The drain terminal and source terminal of each trimming stacked gate device X2_trim0 to X2_trimx is coupled between voltage VBP, the voltage at node N1, and the ground node. Additionally, each of the buffer circuits FB0 to FBx may be supplied with voltage VG, the voltage at node N3, and a ground voltage VSS, as shown in FIG. 1A.

It should be noted that each of trimming stacked gate devices X2_trim0 to X2_trimx can include one or more finger structures arranged in parallel, where each finger structure has an equal number of stacked transistors as the stacked gate device X2. Additionally, trimming stacked gate devices X2_trim0 to X2_trimx can have an equal number or different numbers of finger structures, depending on the type of the trimming code signal TC[0: x] being used. The details thereof are described below with reference to FIGS. 4A to 4D.

Figure 3:
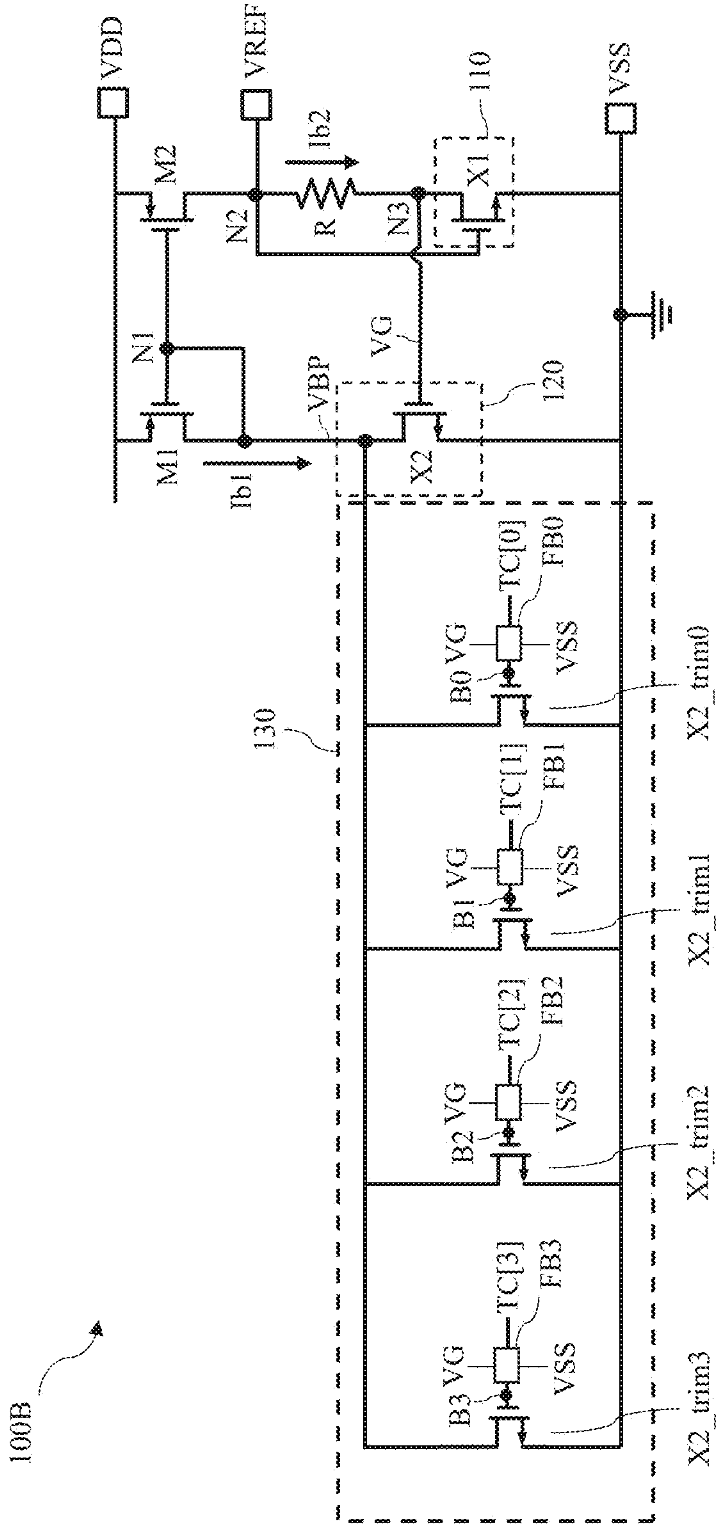
FIG. 3 is a schematic diagram of a voltage reference circuit in accordance with some embodiments of the present disclosure.
Figure 4A:
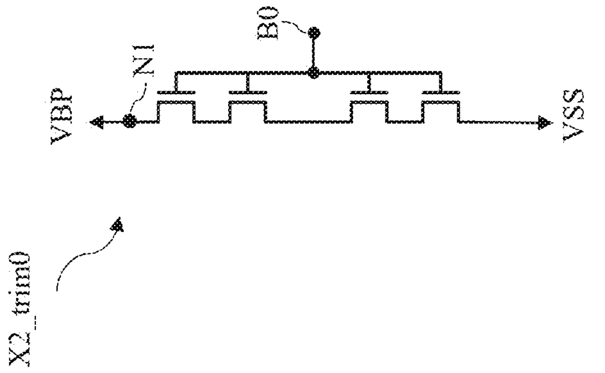
FIGS. 4A-4D are schematic diagrams of trimming stacked gate devices with different number of finger structures in accordance with some embodiments of the present disclosure.
Figure 4B:
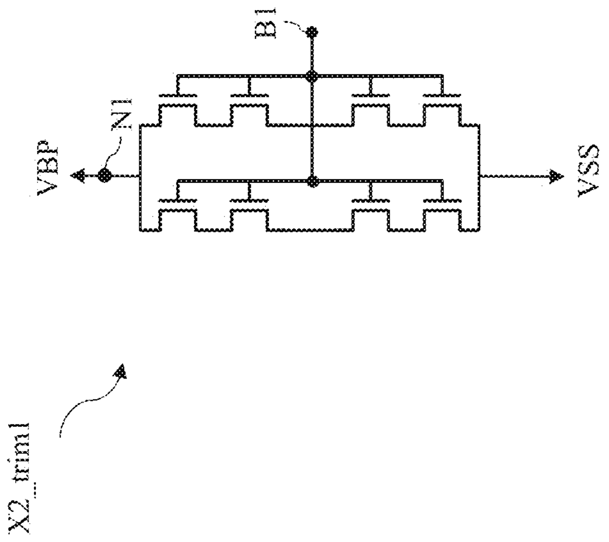
Figure 4D:
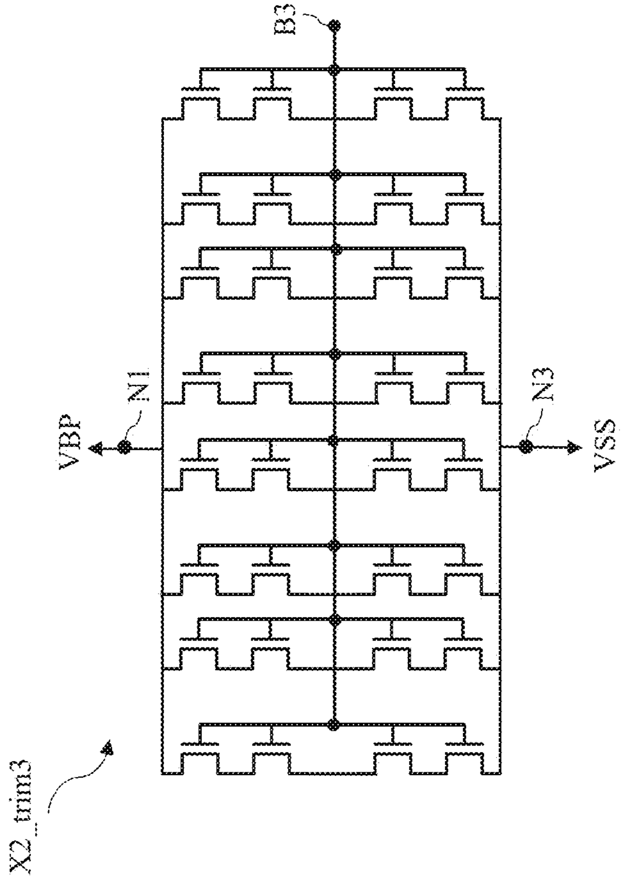
Figure 4C:
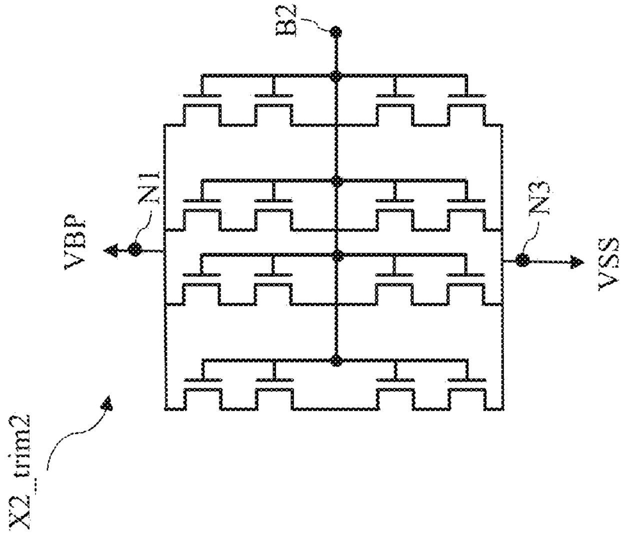

FIG. 3 is a schematic diagram of a voltage reference circuit in accordance with some embodiments of the present disclosure.

In some embodiments, the number of fingers coupled to the stacked gate device X2 in parallel can be adjusted using the trimming circuit 130. For brevity, the trimming circuit 130 within the voltage reference circuit 100B shown in FIG. 3 includes four trimming stacked gate devices X2_trim0 to X2_trim3 that are controlled by respective bits of the trimming code signal TC[0:3] through respective buffer circuits FB0 to FB3. For example, the buffer circuits FB0 to FB3 are supplied with the voltage VG (e.g., gate voltage of the stacked gate device X2) and the ground voltage VSS. Additionally, each bit of the trimming code signal TC[0:3] may be passed to the gate terminals B0 to B3 of the trimming stacked gate devices X2_trim0 to X2_trim3 through the respective buffer circuits FB0 to FB3. Additionally, the voltage range of the each bit of the trimming code signal TC[0:3] is between the voltage VG and the ground voltage VSS.

In some embodiments, each of the trimming stacked gate device X2_trim0 to X2_trim3 has the same number of finger structures, such as 1 to N, where N is a positive integer. When thermal meter coding is used for the trimming circuit 130, each bit of the trimming code signal TC[0:3] can control an equal number of finger structures to couple to the stacked gate device X2 in parallel. For brevity, it is assumed that there are 4 stacked transistors within the stacked gate device X2, and the stacked gate device X2 includes one finger structure. Additionally, each of the trimming stacked gate device X2_trim0 to X2_trim3 includes one finger structure. When the trimming code signal TC[3:0]=4'b1101, the voltage VG is passed to the gate terminals B0, B2, and B3 of the trimming stacked gate device X2_trim0, X2_trim2, and X2_trim3, activating the trimming stacked gate device X2_trim0, X2_trim2, and X2_trim3. Meanwhile, the ground voltage VSS is passed to the gate terminal B1, deactivating the trimming stacked gate device X2_trim1. Accordingly, 3 finger structures are activated to couple to the finger structure of the stacked gate device X2 in parallel, indicating that 4 finger structures in total are used to adjust the downward slope of the V-T (e.g., Vgs2 vs. absolute temperature) curve of the stacked gate device X2, thereby performing temperature-coefficient trimming on the PTAT current (e.g., Ib2=(Vgs1−Vgs2)/R) generated by the voltage reference circuit 100B.

In some embodiments, each of the trimming stacked gate device X2_trim0 to X2_trim3 may have different numbers of finger structures, such as powers of 2. For brevity, it is assumed that there are 4 stacked transistors within the stacked gate device X2, and the stacked gate device X2 includes one finger structure. Additionally, the trimming stacked gate device X2_trim0 to X2_trim3 include 1, 2, 4, and 8 finger structures, respectively, with each finger structure including 4 stacked transistors, as shown in FIGS. 4A-4D. When binary coding is used for the trimming circuit 130, each bit of the trimming code signal TC[0:3] can control different numbers of finger structures to couple to the stacked gate device X2 in parallel. When the trimming code signal TC[3:0]=4'b1101, the voltage VG is passed to the gate terminals B0, B2, and B3 of the trimming stacked gate device X2_trim0, X2_trim2, and X2_trim3, activating the trimming stacked gate device X2_trim0, X2_trim2, and X2_trim3. Meanwhile, the ground voltage VSS is passed to the gate terminal B1, deactivating the trimming stacked gate device X2_trim1. Accordingly, 13 (e.g., 1+4+8) finger structures are activated to couple to the finger structure of the stacked gate device X2 in parallel, indicating that 14 finger structures in total are used to adjust the downward slope of the V-T (e.g., Vgs2 vs. absolute temperature) curve of the stacked gate device X2, thereby performing temperature-coefficient trimming on the PTAT current (e.g., Ib2=(Vgs1−Vgs2)/R) generated by the voltage reference circuit 100B.

FIGS. 5A-5D are schematic diagrams of a buffer circuit in different implementations in accordance with some embodiments of the present disclosure.

Figure 5B:
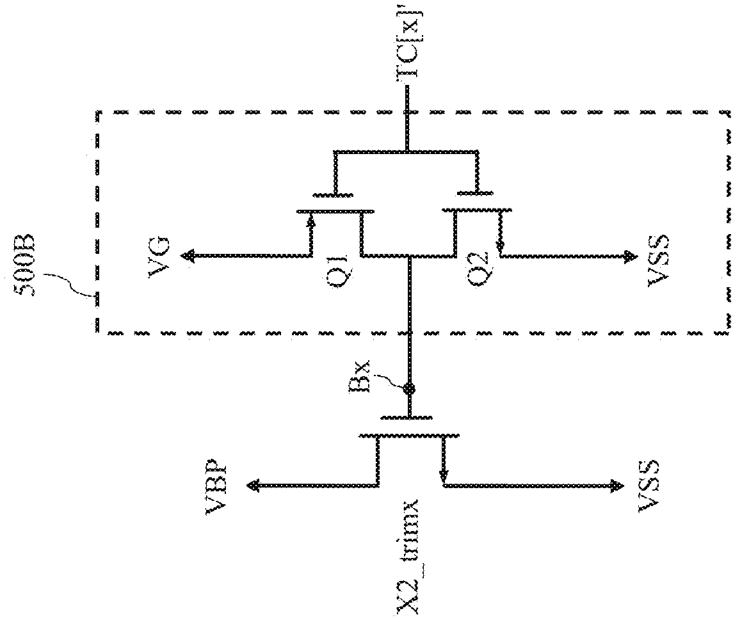
FIGS. 5A-5D are schematic diagrams of a buffer circuit in different implementations in accordance with some embodiments of the present disclosure.
Figure 5A:
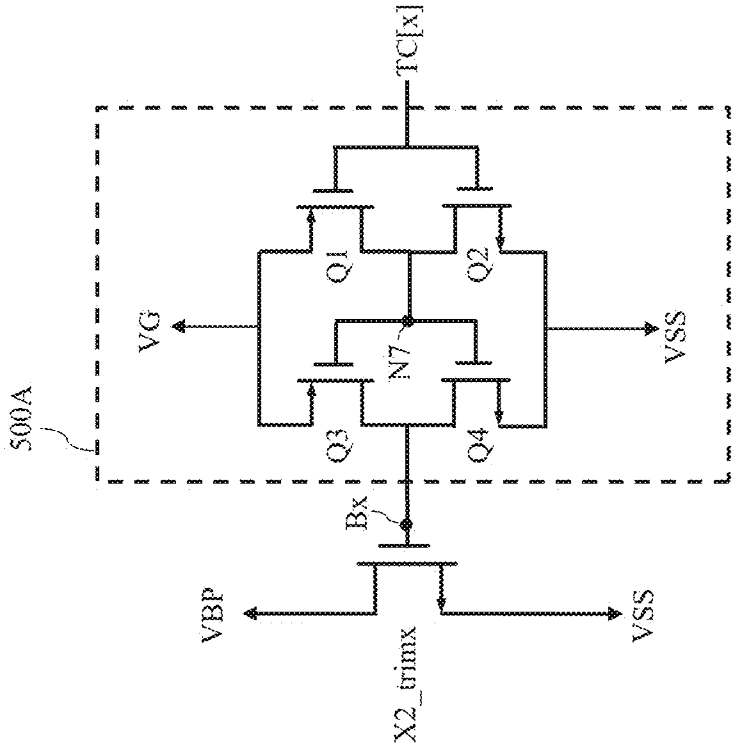

In some embodiments, each of the buffer circuits FB0 to FBx in FIG. 1A is implemented using the buffer circuit 500A shown in FIG. 5A. The buffer circuit 500A includes two inverters (e.g., transistors Q1+Q2 and Q3+Q4) connected in series, that are supplied with the voltage VG and the ground voltage VSS. The input signal TC [x] of the buffer circuit 500A can be passed to the gate terminal Bx of the trimming stacked gate device X2_trimx through the buffer circuit 500A. Additionally, when the input signal TC [x] is in the high logic state (e.g., "1") and the low logic state (e.g., "0"), the input signal TC [x] can be at the voltage VG and the ground voltage VSS, respectively. For example, in response to the input signal TC [x] being in the high logic state (e.g., "1"), transistor Q2 is turned on and transistor Q1 is turned off, causing the voltage at node N7 to be pulled down to the ground voltage VSS. At this time, transistor Q3 is turned on and transistor Q4 is turned off, causing the voltage at the gate terminal Bx to be pulled up to the voltage VG. As a result, the trimming stacked gate device X2_trimx is turned on (e.g., selected), and the one or more finger structures within the trimming stacked gate device X2_trimx are coupled to the stacked gate device X2 in parallel, indicating that the selected trimming stacked gate device X2_trimx can contributes to the V-T curve of the temperature-sensitive device 120.

On the other hand, in response to the input signal TC[x] being in the low logic state (e.g., "0"), transistor Q1 is turned on and transistor Q2 is turned off, causing the voltage at node N7 to be pulled up to the voltage VG. At this time, transistor Q4 is turned on and transistor Q3 is turned off, causing the voltage at the gate terminal Bx to be pulled down to the ground voltage VSS. As a result, the trimming stacked gate device X2_trimx is turned off (e.g., unselected), and the one or more finger structures within the trimming stacked gate device X2_trimx are not coupled to the stacked gate device X2 in parallel, indicating that the unselected trimming stacked gate device X2_trimx has no influence on the V-T curve of the temperature-sensitive device 120.

In some embodiments, each of the buffer circuits FB0 to FBx in FIG. 1A is implemented using the buffer circuit 500B shown in FIG. 5B. The input signal of the buffer circuit 500B may be TC[x]' which is complementary to the respective bit TC[x] of the trimming signal TC. For example, in response to the input signal TC[x]' being in the high logic state (e.g., "1"), transistor Q2 is turned on and transistor Q1 is turned off, causing the voltage at the gate terminal Bx to be pulled down to the ground voltage VSS. As a result, the trimming stacked gate device X2_trimx is turned off (e.g., unselected), and the one or more finger structures within the trimming stacked gate device X2_trimx are not coupled to the stacked gate device X2, indicating that the unselected trimming stacked gate device X2_trimx has no influence on the V-T curve of the temperature-sensitive device 120. On the other hand, in response to the input signal TC[x]' being in the low logic state (e.g., "0"), transistor Q1 is turned on and transistor Q2 is turned off, causing the voltage at the gate terminal Bx to be pulled up to the voltage VG. As a result, the trimming stacked gate device X2_trimx is turned on (e.g., selected), and the one or more finger structures within the trimming stacked gate device X2_trimx are coupled to the stacked gate device X2 in parallel, indicating that the selected trimming stacked gate device X2_trimx can contribute to the V-T curve of the temperature-sensitive device 120.

Figure 5D:
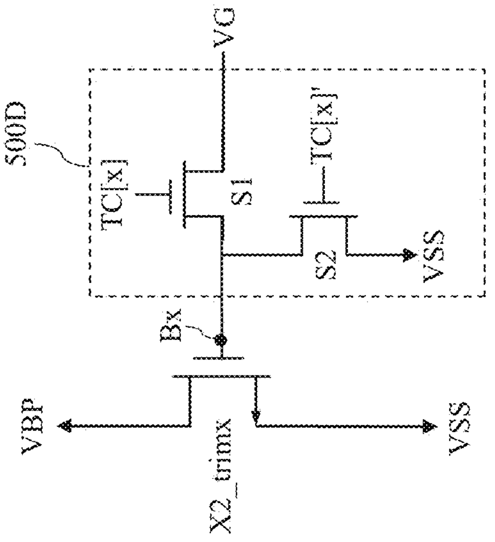
Figure 5C:
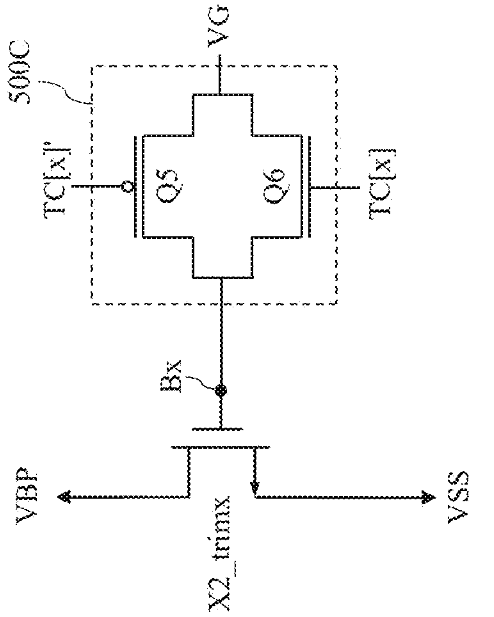

In some embodiments, each of the buffer circuits FB0 to FBx in FIG. 1A is implemented using the buffer circuit 500C shown in FIG. 5C. The buffer circuit 500C may be implemented using a CMOS transmission gate which includes transistors Q5 and Q6. In response to the input signals TC[x] and TC[x]' being respectively in the high logic state (e.g., "1") and the low logic state (e.g., "0"), transistors Q5 and Q6 are turned on, causing the voltage VG to be passed to the gate terminal Bx through the buffer circuit 500C. As a result, the trimming stacked gate device X2_trimx is turned on (e.g., selected), and the one or more finger structures within the trimming stacked gate device X2_trimx are coupled to the stacked gate device X2 in parallel, indicating that the selected trimming stacked gate device X2_trimx can contribute to the V-T curve of the temperature-sensitive device 120. On the other hand, in response to the input signals TC[x] and TC[x]' being respectively in the low logic state (e.g., "0") and the high logic state (e.g., "1"), transistors Q5 and Q6 are turned off, causing the gate terminal Bx being in a floating state. When the gate terminal Bx of the trimming stacked gate device X2_trimx is floating, the trimming stacked gate device X2_trimx is turned off (e.g., unselected), and the one or more finger structures within the trimming stacked gate device X2_trimx are not coupled to the stacked gate device X2, indicating that the unselected trimming stacked gate device X2_trimx has no influence on the V-T curve of the temperature-sensitive device 120.

In some embodiments, each of the buffer circuits FB0 to FBx in FIG. 1A is implemented using the buffer circuit 500D shown in FIG. 5D. The buffer circuit 500D includes switches S1 and S2 that are respectively controlled by the input signals TC[x] and TC[x]'. In response to the input signals TC[x] and TC[x]' being respectively in the high logic state (e.g., "1") and the low logic state (e.g., "0"), switch S1 is activated and switch S2 is deactivated, causing the voltage VG to be passed to the gate terminal Bx through switch S1. As a result, the trimming stacked gate device X2_trimx is turned on (e.g., selected), and the one or more finger structures within the trimming stacked gate device X2_trimx are coupled to the stacked gate device X2 in parallel, indicating that the selected trimming stacked gate device X2_trimx can contribute to the V-T curve of the temperature-sensitive device 120. On the other hand, in response to the input signals TC[x] and TC[x]' being respectively in the low logic state (e.g., "0") and the high logic state (e.g., "1"), switch S1 is deactivated and switch S2 is activated, causing the voltage at the gate terminal Bx to be pulled down to the ground voltage VSS. As a result, the trimming stacked gate device X2_trimx is turned off (e.g., unselected), and the one or more finger structures within the trimming stacked gate device X2_trimx are not coupled to the stacked gate device X2, indicating that the unselected trimming stacked gate device X2_trimx has no influence on the V-T curve of the temperature-sensitive device 120.

Figure 6:
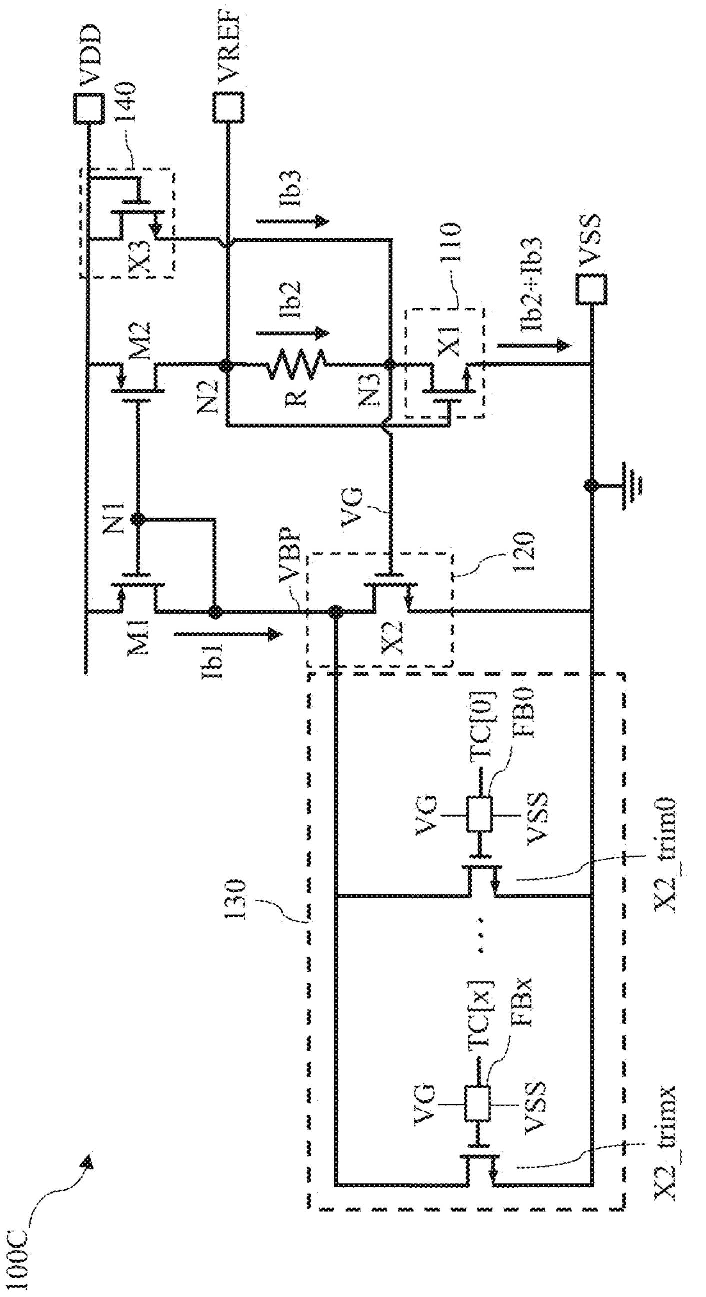
FIG. 6 is a schematic diagram of a voltage reference circuit in accordance with some embodiments of the present disclosure.

FIG. 6 is a schematic diagram of a voltage reference circuit in accordance with some embodiments of the present disclosure.

The voltage reference circuit 100C shown in FIG. 6 is similar to the voltage reference circuit 100A shown in FIG. 1A, with a difference being that a temperature-sensitive device 140 is coupled between the power supply voltage VDD and node N3. In some embodiments, the temperature-sensitive device 140 includes a stacked gate device X3, which is "ratioed" from the stacked gate device X1, indicating that the stacked gate device X3 is substantially the same as the stacked gate device X1. As shown in FIG. 6, the stacked gate device X3 is in a diode-connected configuration, with a gate terminal and a (S/D) terminal electrically connected to the power supply voltage VDD, and a (S/D) terminal electrically connected to node N3. Thus, a bias current Ib3 flows through the channel of the stacked gate device X3 and the stacked gate device X1, and a total current of Ib2+Ib3 flows through the stacked gate device X1. It should be noted that the bias current Ib2 flowing through the resistor R and the stacked gate device X2 is a PTAT current, while the bias current Ib3 flowing through the stacked gate device X3 is a CTAT current. As such, while performing temperature-coefficient compensation of the reference voltage VREF, the bias current Ib3 can help to reduce the bias currents Ib1 and Ib2, allowing fine-tuning of the bias current Ib2 using the trimming circuit 130 (e.g., each step for adjusting the bias currents Ib1 and Ib2 can become smaller for each bit of the trimming code signal TC). The details for the trimming circuit 130 shown in FIG. 6 can be referred to the embodiments of FIGS. 3, 4A-4D, and 5A-5D, and thus will not be repeated here.

In some embodiments, the accuracy of the reference voltage VREF generated by the voltage reference circuit 100C is increased by reducing the ratio between the bias current Ib2 (e.g., PTAT current) and the bias current Ib3 (e.g., CTAT current). In some embodiments, the mean AVG and standard deviation σ of the reference voltage VREF generated by the voltage reference circuit 100C is calculated using 300 rounds of Monte Carlo simulation at the condition that the reference voltage VREF is around 25° C. The inaccuracy of the voltage reference voltage VREF generated by the voltage reference circuit 100C can be calculated by 3σ/AVG, which is within 1.5%.

Figure 7:
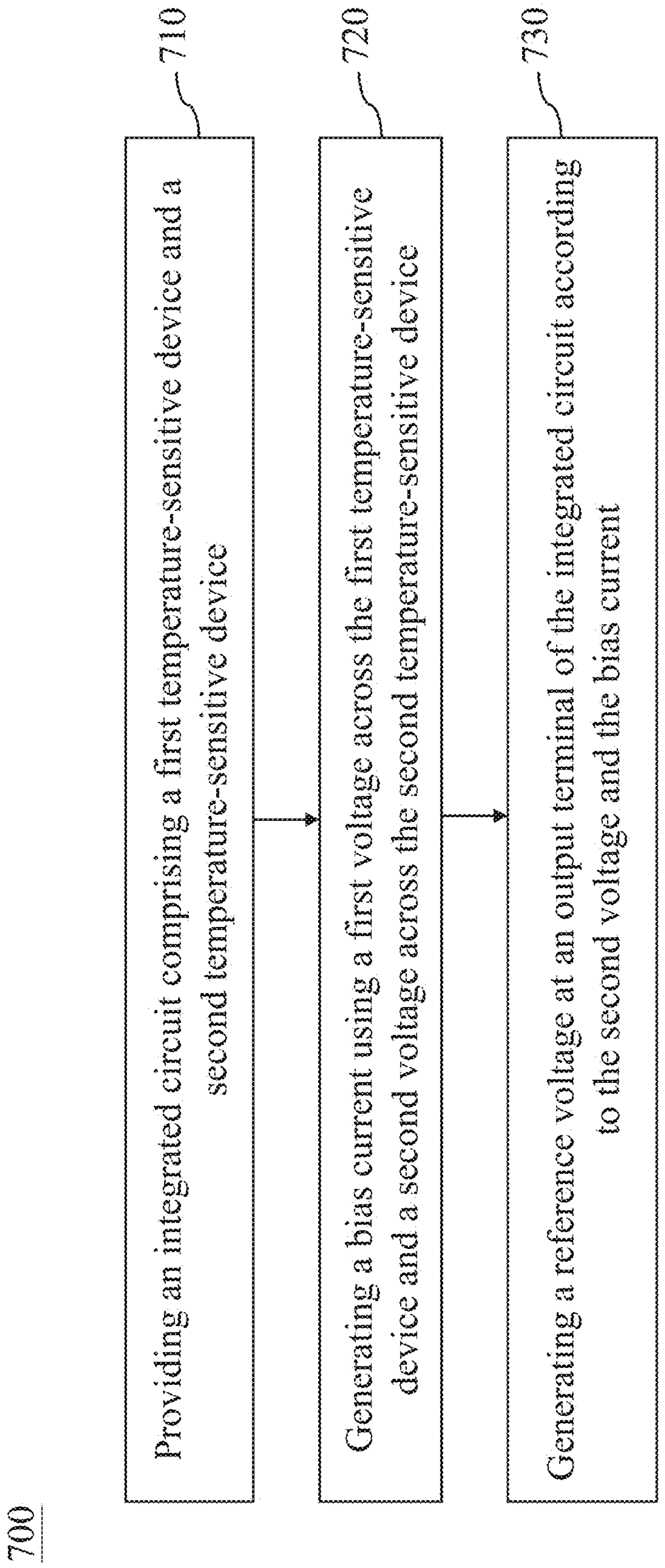
FIG. 7 is a flowchart of a method of operating a voltage reference circuit in accordance with some embodiments of the present disclosure.

FIG. 7 is a flowchart of a method of operating a voltage reference circuit in accordance with some embodiments of the present disclosure. The sequence in which the operations of method 700 are depicted in FIG. 7 is for illustration only; the operations of method 700 are capable of being executed in sequences that differ from that depicted in FIG. 7. It is understood that additional operations may be performed before, during, and/or after the method 700 depicted in FIG. 7, and that some other processes may only be briefly described herein.

In operation 710, an integrated circuit comprising a first temperature-sensitive device and a second temperature-sensitive device is provided. In the embodiment of FIG. 1A, the voltage reference circuit 100A (e.g., the integrated circuit) includes temperature-sensitive devices 110 and 120 (e.g., the first and second temperature-sensitive device, respectively).

In operation 720, a bias current is generated using a first voltage across the first temperature-sensitive device and a second voltage across the second temperature-sensitive device, wherein the bias current flows from an output terminal of the integrated circuit through a resistor and the first temperature-sensitive device. In the embodiment of FIG. 2A, since the number X1 is greater than the number X2, as the temperature increases, the decrement of the gate-to-source Vgs1 of the stacked gate device X1 is smaller than that of the gate-to-source Vgs2 of the stacked gate device X2, resulting in the difference Vgs1−Vgs2 being proportional to the absolute temperature. Accordingly, the bias current Ib2 is generated, which flows through the resistor and the stacked gate device X1.

In operation 730, a reference voltage is generated at the output terminal of the integrated circuit according to the second voltage and the bias current. In the embodiment of FIG. 1A, CTAT scheme of the threshold voltage Vth of the stacked gate device X1 is compensated with PTAT scheme of the bias current Ib2 flowing through the stacked gate device X1 to generate the reference voltage VREF. On the other hand, while the gate-to-source voltage Vgs2 (e.g., the second voltage) is CTAT and the bias current Ib2 (e.g., the bias current) is PTAT, the CTAT scheme can also be compensated with the PTAT scheme in another way to generate the reference voltage VREF.

An aspect of the present disclosure provides an integrated circuit, which includes a first temperature-sensitive device and a second temperature-sensitive device. The first temperature-sensitive device is configured to generate a reference voltage at an output terminal of the integrated circuit. The second temperature-sensitive device is coupled to the output terminal of the integrated circuit through a resistor, and configured to operate in conjunction with the first temperature-sensitive device to generate a first bias current flowing from the output terminal of the integrated circuit to a ground node through the resistor and the first temperature-sensitive device. The first bias current monotonically increases as an absolute temperature of the integrated circuit increases.

Another aspect of the present disclosure provides an integrated circuit, which includes a first temperature-sensitive device and a second temperature-sensitive device. The second temperature-sensitive device is coupled to the first temperature-sensitive device through a resistor, and configured to function as a first voltage source varying with an absolute temperature of the integrated circuit, and operate in conjunction with the first temperature-sensitive device to function as a second voltage source varying with the absolute temperature of the integrated circuit. The second temperature-sensitive device is further configured to compensate the first voltage source with the second voltage source to generate a reference voltage at an output terminal of the integrated circuit.

Yet another aspect of the present disclosure provides a method. The method includes the following steps: providing an integrated circuit comprising a first temperature-sensitive device and a second temperature-sensitive device; generating a bias current using a first voltage across the first temperature-sensitive device and a second voltage across the second temperature-sensitive device, wherein the bias current flows from an output terminal of the integrated circuit through a resistor and the first temperature-sensitive device; and generating a reference voltage at the output terminal of the integrated circuit according to the second voltage and the bias current. The first voltage and the second voltage monotonically decrease as an absolute temperature of the integrated circuit increases, and the bias current monotonically increases as the absolute temperature increases.

The methods and features of the present disclosure have been sufficiently described in the provided examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, can be utilized according to the present disclosure.

Accordingly, the appended claims are intended to include within their scope processes, machines, manufacture, compositions of matter, means, methods or steps. In addition, each claim constitutes a separate embodiment, and the combination of various claims and embodiments are within the scope of the present disclosure.

What is claimed is:

1. An integrated circuit, comprising:

a first temperature-sensitive device, configured to generate a reference voltage at an output terminal of the integrated circuit;

a second temperature-sensitive device, coupled to the output terminal of the integrated circuit through a resistor, and configured to operate in conjunction with the first temperature-sensitive device to generate a first bias current which flows from the output terminal of the integrated circuit to a ground node through the resistor and the first temperature-sensitive device, wherein the first bias current monotonically increases as an absolute temperature of the integrated circuit increases; and a trimming circuit comprising a plurality of trimming stacked gate devices, and configured to adjust a number of the trimming stacked gate devices that are coupled in parallel with the second temperature-sensitive device.

2. The integrated circuit of claim 1, wherein the resistor is coupled between the output terminal of the integrated circuit and a first node, and the integrated circuit further comprises a current source, coupled to the second temperature-sensitive device, and configured to generate a second bias current, which is substantially equal to the first bias current, flowing through the second temperature-sensitive device.

3. The integrated circuit of claim 2, wherein the first temperature-sensitive device comprises a first stacked gate device having a gate terminal connected to the output terminal of the integrated circuit, a first terminal connected to the first node, and a second terminal connected to the ground node; and the first stacked gate device comprises one or more first finger structures arranged in parallel, with each first finger structure comprising a first number of field-effect transistors connected in series.

4. The integrated circuit of claim 3, wherein the second temperature-sensitive device comprises a second stacked gate device having a gate terminal connected to the first node of the integrated circuit, a first terminal connected to a second node, and a second terminal connected to the ground node; and the second stacked gate device comprises one or more second finger structures arranged in parallel, with each second finger structure comprising a second number of field-effect transistors connected in series.

5. The integrated circuit of claim 4, wherein the first number is greater than the second number.

6. The integrated circuit of claim 5, wherein the field-effect transistors within the first stacked gate device and the second stacked gate device have a substantially equal threshold voltage.

7. The integrated circuit of claim 6, wherein:

the trimming circuit further comprises:

a plurality of buffer circuits, each buffer circuit configured to be supplied with a voltage at the first node and a ground voltage, wherein each of the trimming stacked gate devices is controlled by a respective bit of a trimming code signal through a respective one of the buffer circuits.

8. The integrated circuit of claim 7, wherein each of the trimming stacked gate devices comprises a different number of finger structures in powers of 2, and each finger structure within the trimming stacked gate devices comprises the second number of field-effect transistors connected in series.

9. The integrated circuit of claim 7, wherein each of the trimming stacked gate devices comprises an equal number of finger structures, and each finger structure within the trimming stacked gate devices comprises the second number of field-effect transistors connected in series.

10. The integrated circuit of claim 7, wherein in response to the respective bit of a specific trimming stacked gate device being in a first logic state, the reference voltage is provided to a gate terminal of the specific trimming stacked gate device through the respective buffer circuit, enabling the specific trimming stacked gate device to couple to the second stacked gate device in parallel.

11. The integrated circuit of claim 10, wherein in response to the respective bit of the specific trimming stacked gate device being in a second logic state complementary to the first logic state, the ground voltage is provided to the gate terminal of the specific trimming stacked gate device through the respective buffer circuit, disabling the specific trimming stacked gate device from coupling to the second stacked gate device in parallel.

12. The integrated circuit of claim 7, further comprising: a third temperature-sensitive device, coupled between a power supply voltage and the first node, and configured to generate a third bias current, which monotonically decreases with the absolute temperature, flowing through the third temperature-sensitive device and the first temperature-sensitive device.

13. The integrated circuit of claim 12, wherein the third temperature-sensitive device comprises a third stacked gate device having a gate terminal and a first terminal connected to the power supply voltage, and a second terminal connected to the first node, and the third stacked gate device comprises one or more third finger structures arranged in parallel, with each third finger structure comprising the first number of field-effect transistors connected in series.

14. An integrated circuit, comprising:

a first temperature-sensitive device;

a second temperature-sensitive device, coupled to the first temperature-sensitive device through a resistor, and configured to function as a first voltage source varying with an absolute temperature of the integrated circuit, and operate in conjunction with the first temperature-sensitive device to function as a second voltage source varying with the absolute temperature of the integrated circuit, wherein the second temperature-sensitive device is further configured to compensate the first voltage source with the second voltage source to generate a reference voltage at an output terminal of the integrated circuit; and a trimming circuit comprising a plurality of trimming stacked gate devices, and configured to adjust a number of the trimming stacked gate devices that are coupled in parallel with the second temperature-sensitive device.

15. The integrated circuit of claim 14, wherein a first voltage provided by the first voltage source is complementary to the absolute temperature of the integrated circuit, and a second voltage provided by the second voltage source is proportional to the absolute temperature.

16. The integrated circuit of claim 15, wherein the first temperature-sensitive device is configured to generate a third voltage across a first node and a ground node, and cause a bias current to flow from the output terminal of the integrated circuit to the ground node through the resistor and the second temperature-sensitive device.

17. The integrated circuit of claim 16, wherein the bias current is equal to a voltage difference between the reference voltage and the third voltage divided by a resistance of the resistor.

18. The integrated circuit of claim 17, wherein the first temperature-sensitive device comprises a first stacked gate device having a first number of first field-effect transistors connected in series, the second temperature-sensitive device comprises a second stacked gate device having a second number of second field-effect transistors connected in series, and the second number is greater than the first number; and the trimming circuit further comprises a plurality of buffer circuits, wherein each of the trimming stacked gate devices is controlled by a respective bit of a trimming code signal through a respective one of the buffer circuits.

19. A method, comprising:

providing an integrated circuit comprising a first temperature-sensitive device and a second temperature-sensitive device;

generating a bias current using a first voltage across the first temperature-sensitive device and a second voltage across the second temperature-sensitive device, wherein the bias current flows from an output terminal of the integrated circuit through a resistor and the first temperature-sensitive device;

generating a reference voltage at the output terminal of the integrated circuit according to the second voltage and the bias current; and adjusting a number of trimming stacked gate devices coupled in parallel with the second temperature-sensitive device, wherein the first voltage and the second voltage monotonically decrease as an absolute temperature of the integrated circuit increases, and the bias current monotonically increases as the absolute temperature increases.

20. The method of claim 19, wherein a decrement of the first voltage in accordance with an increment of the absolute temperature is smaller than that of the second voltage in accordance with the increment of the absolute temperature.

* * * * *